United States Patent
Patel et al.

(10) Patent No.: US 8,024,383 B2
(45) Date of Patent: Sep. 20, 2011

(54) FAT DIRECTORY STRUCTURE FOR USE IN TRANSACTION SAFE FILE

(75) Inventors: Sachin Patel, Bellevue, WA (US); Yadhu Gopalan, Redmond, WA (US); Andrew Rogers, Bellevue, WA (US)

(73) Assignee: Mircrosoft Corporation, Redmond, WA (US)

( * ) Notice: Subject to any disclaimer, the term of this patent is extended or adjusted under 35 U.S.C. 154(b) by 0 days.

(21) Appl. No.: 12/611,046

(22) Filed: Nov. 2, 2009

(65) Prior Publication Data

US 2010/0049776 A1    Feb. 25, 2010

Related U.S. Application Data

(63) Continuation of application No. 11/653,585, filed on Jan. 16, 2007, now Pat. No. 7,613,738.

(51) Int. Cl.
*G06F 17/30* (2006.01)

(52) U.S. Cl. ........... 707/821; 711/170; 711/206; 714/19

(58) Field of Classification Search .............. 707/611, 707/828, 999.205, 821; 711/1–2, 100, 170, 711/206
See application file for complete search history.

(56) References Cited

U.S. PATENT DOCUMENTS

| | | |
|---|---|---|
| 5,086,502 A | 2/1992 | Malcolm |
| 5,201,044 A | 4/1993 | Frey et al. |
| 5,297,148 A | 3/1994 | Harari et al. |
| 5,469,562 A | 11/1995 | Saether |
| 5,537,636 A | 7/1996 | Uchida et al. |
| 5,546,389 A | 8/1996 | Wippenbeck et al. |
| 5,574,907 A | 11/1996 | Jernigan, IV et al. |
| 5,699,548 A | 12/1997 | Choudhury et al. |
| 5,732,268 A | 3/1998 | Bizzarri |
| 5,734,340 A | 3/1998 | Kennedy |
| 5,778,168 A | 7/1998 | Fuller |
| 5,813,011 A | 9/1998 | Yoshida et al. |
| 5,825,734 A | 10/1998 | Igarashi et al. |
| 5,832,515 A | 11/1998 | Ledain et al. |
| 5,850,506 A | 12/1998 | Gordons |
| 5,907,672 A | 5/1999 | Matze et al. |
| 5,983,240 A * | 11/1999 | Shoroff et al. ........................ 1/1 |
| 6,023,744 A | 2/2000 | Shoroff et al. |
| 6,032,223 A | 2/2000 | Beelitz |
| 6,037,738 A | 3/2000 | Morita et al. |
| 6,049,807 A | 4/2000 | Carroll et al. |
| 6,078,999 A | 6/2000 | Raju et al. |
| 6,108,759 A | 8/2000 | Orcutt et al. |
| 6,192,432 B1 | 2/2001 | Slivka et al. |
| 6,205,558 B1 | 3/2001 | Sobel |

(Continued)

OTHER PUBLICATIONS

Microsoft Press Computer Dictionary Third Edition, "fragmentation", Microsoft Press, 1997, p. 206.

(Continued)

*Primary Examiner* — Debbie Le (57) ABSTRACT

Directories in a file system are defined with a dummy cluster in a file allocation table as the initial entry. Subsequent clusters in a directory's definition may define any data for the directory that can be changed in a transaction-safe mode. A directory may be modified in a transaction-safe mode by modifying any of the subsequent clusters while tracking changes in a second file allocation table. When the changes have been made to the directory, a pointer to the second file allocation table may be switched to indicate that the second file allocation table is now last known good. The first file allocation table may then be synchronized with the second.

22 Claims, 4 Drawing Sheets

100
SEQUENCE FOR TRANSACTION-SAFE FILE MODIFICATION

U.S. PATENT DOCUMENTS

| | | |
|---|---|---|
| 6,286,113 B1 | 9/2001 | Sembach et al. |
| 6,374,268 B1 | 4/2002 | Testardi |
| 6,377,958 B1 | 4/2002 | Orcutt |
| 6,378,031 B1 | 4/2002 | Kuno et al. |
| 6,470,345 B1 | 10/2002 | Doutre et al. |
| 6,510,552 B1 | 1/2003 | Benayoun et al. |
| 6,529,966 B1 | 3/2003 | Willman et al. |
| 6,571,259 B1 | 5/2003 | Zheng et al. |
| 6,594,725 B2 | 7/2003 | Ando et al. |
| 6,615,365 B1 | 9/2003 | Jenevein et al. |
| 6,615,404 B1 | 9/2003 | Garfunkel et al. |
| 6,658,437 B1 | 12/2003 | Lehman |
| 6,662,309 B2 | 12/2003 | Ando et al. |
| 6,675,180 B2 | 1/2004 | Yamashita |
| 6,792,518 B2 | 9/2004 | Armangau et al. |
| 6,856,993 B1 | 2/2005 | Verma et al. |
| 6,883,114 B2 | 4/2005 | Lasser |
| 6,907,184 B1 | 6/2005 | Yokota et al. |
| 6,922,708 B1 | 7/2005 | Sedler |
| 7,051,251 B2 | 5/2006 | Moore et al. |
| 7,062,602 B1 | 6/2006 | Moore et al. |
| 7,089,448 B2 | 8/2006 | Hinshaw |
| 7,174,420 B2 | 2/2007 | Malueg et al. |
| 7,363,540 B2 | 4/2008 | Patel et al. |
| 7,613,738 B2 | 11/2009 | Patel et al. |
| 7,685,171 B1 | 3/2010 | Beaverson et al. |
| 7,747,664 B2 | 6/2010 | Patel et al. |
| 2001/0016841 A1 | 8/2001 | Karasudani |
| 2001/0054129 A1 | 12/2001 | Wouters |
| 2002/0152354 A1 | 10/2002 | Harmer |
| 2003/0028765 A1 | 2/2003 | Cromer et al. |
| 2003/0233385 A1 | 12/2003 | Srinivasa et al. |
| 2004/0030847 A1 | 2/2004 | Tremaine |
| 2004/0078704 A1 | 4/2004 | Malueg et al. |
| 2004/0210706 A1 | 10/2004 | In et al. |
| 2004/0250172 A1 | 12/2004 | Patel et al. |
| 2005/0027746 A1 | 2/2005 | Lin et al. |
| 2005/0060316 A1 | 3/2005 | Kamath et al. |
| 2006/0020745 A1* | 1/2006 | Conley et al. ............ 711/103 |
| 2007/0136387 A1 | 6/2007 | Malueg et al. |
| 2007/0239957 A1 | 10/2007 | Lin |
| 2008/0172425 A1 | 7/2008 | Patel et al. |
| 2008/0172426 A1 | 7/2008 | Patel et al. |
| 2008/0177939 A1 | 7/2008 | Patel et al. |

OTHER PUBLICATIONS

Microsoft Press Computer Dictionary Third Edition, "flush", Microsoft Press, 1997, p. 202.

Jonge, "The Logical Disk: A New Approach to Improving File Systems", In Proceedings of the 14th ACM Symposium on Operating Systems Principles, 1993.

Farr et al., "An Optimum Disc Organization for a Virtual Memory System", Computer Design, Jun. 1971, pp. 49-54.

Lee, Chiung-San, "Server-Based Maintenance Approach for Computer Classroom Workstations", IEICE TRANS. INF. & SYST., vol. E83-D, No. 4, Apr. 2000.

Barreto et al., "A Highly Available Replicated File System for Resource-Constrained Windows CE .Net Devices", In 3rd International Conference on .NET Technologies, 2005.

Otoo et al., "Non-shared disk cluster—a fault tolerant, commodity approach to hi-bandwidth data analysis", 2001,available at http://www.ihep.ac.cn/~chep01/paper/4-026.pdf.

Sivathanu et al., "Life or Death at Block-Level", In Proceedings of the 6th Symposium on Operating Systems Design and Implementation (OSDI '04), Dec. 2004.

"Transactional file access", Date: Jun. 2, 2005, http://jakarta.apache.org/commons/transaction/file/index.html.

"Transaction-Safe FAT File System", Date: 2006, http://msdn.microsoft.com/library/default.asp?url=/library/en-us/wcemain4/html/cmcontransaction-safefatfilesystem.asp.

"ZFS, Sun's Cutting-Edge File System (Part 1: Storage Integrity, Security, and Scalability)", Date: Aug. 2006, http://www.sun.com/bigadmin/features/articles/zfs_part1.scalable.html#transaction.

Chen, et al., "The Rio File Cache: Surviving Operating System Crashes", Date: 1996, http://www.cs.ucsd.edu/classes/wi01/cse221/chen,ng,rajamani,aycock.the_rio_file_cache.surviving_operating_system_crashes.pdf.

Kashyap, Aditya, "File System Extensibility and Reliability Using an in-Kernel Database", Date: Dec. 2004, http://www.am-utils.org/docs/kbdbfs-msthesis/index.html.

\* cited by examiner

FIG. 4

FAT DIRECTORY STRUCTURE FOR USE IN TRANSACTION SAFE FILE

CROSS-REFERENCE TO RELATED APPLICATIONS

This application is a continuation of and claims priority to co-pending U.S. patent application Ser. No. 11/653,585, which was filed on Jan. 16, 2007 and is incorporated by reference in its entirety.

BACKGROUND

Data files are often arranged in a directory structure in a file system. Such file systems may be implemented on storage systems such as disk drives, flash memory, and other data storage devices. A hierarchical directory structure organizes various files into groups that can be browsed and displayed.

Many file systems use a file allocation table otherwise known as FAT. The FAT may be used differently in various applications. In some applications, a FAT may be used to link various clusters of data together into a file that is comprised of several such clusters.

As file systems have become more and more complex, some operations performed on the file system may take several steps. The file system may be vulnerable to corruption if a power disruption or other interruption occurs during such steps and before they are complete.

SUMMARY

Directories in a file system are defined with a dummy cluster in a file allocation table as the initial entry. Subsequent clusters in a directory's definition may define any data for the directory that can be changed in a transaction-safe mode. A directory may be modified in a transaction-safe mode by modifying any of the subsequent clusters while tracking changes in a second file allocation table. When the changes have been made to the directory, a pointer to the second file allocation table may be switched to indicate that the second file allocation table is now last known good. The first file allocation table may then be synchronized with the second.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

File modifications, including modifications to a directory structure, may be done in a transaction-safe manner by creating directories that have a first data cluster that contains dummy data. Subsequent clusters may contain data that describe the directory. Because a first cluster contains dummy data, the corresponding location in the file allocation table may be changed to point to a new location that may contain updated or modified directory data.

This structure is useful in a transaction-safe file system that uses a last known good copy of a file allocation table and a second or modified copy of a file allocation table. The second copy is used to prepare a file modification transaction and than a flag may be set to indicate that the second copy is now the last known good copy. This atomic modification commits the transaction, after which the two file allocation tables may be synchronized. Such a method may be used to minimize any problems that may occur when a power outage or other disruption might harm a file system because the file system is kept in a known good state even while changes are being processed. Only when the changes are complete is an atomic action used to commit the entire change.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
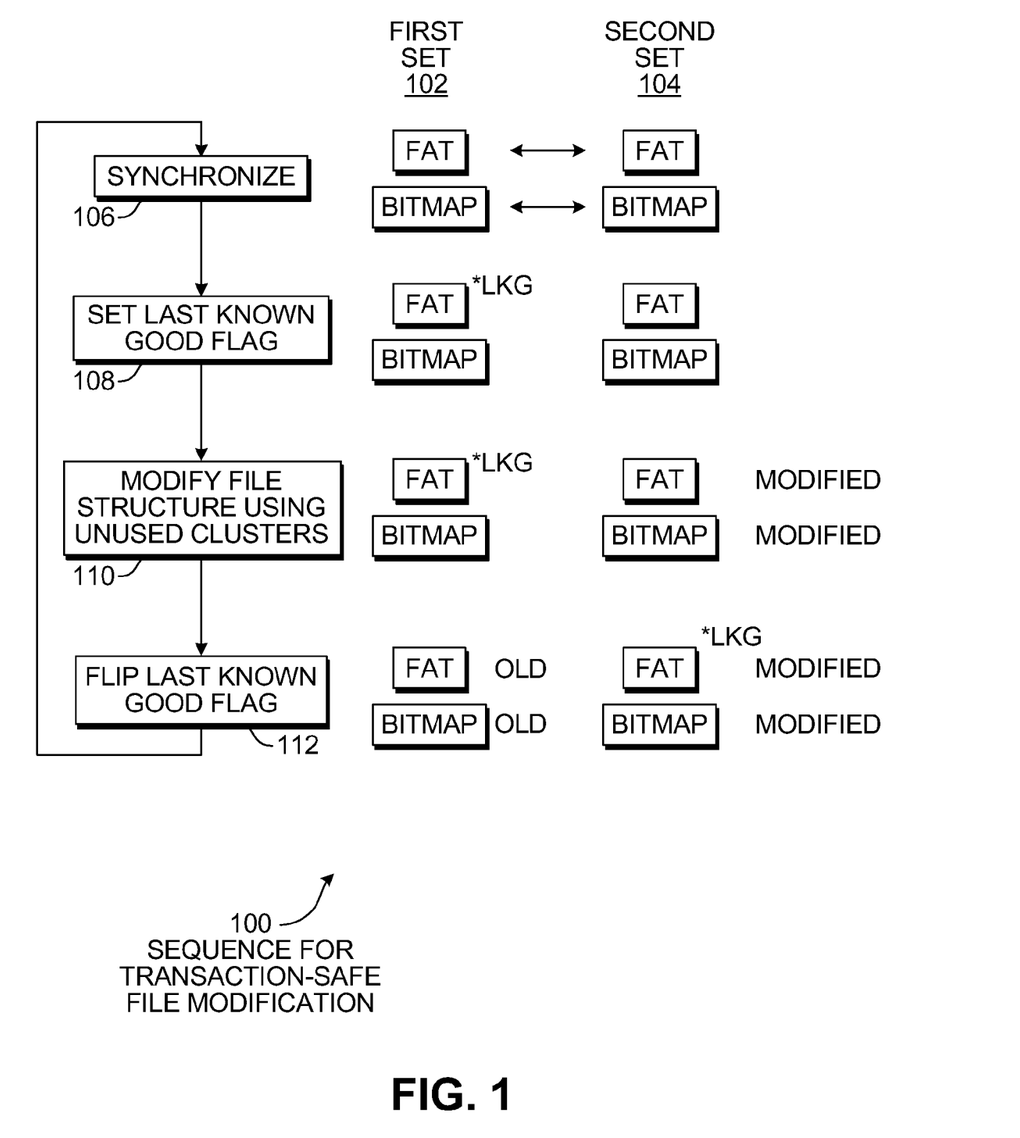
FIG. 1 is a pictorial illustration of an embodiment showing a sequence for transaction-safe file modification.

FIG. 1 is a diagram of an embodiment 100 showing a sequence for transaction-safe file modification. The sequence of a first set of a file allocation table and bitmap image 102 is shown next to the sequence for a second set of a file allocation table and a bitmap image 104. The file allocation tables may be used to describe the sequence of clusters that are assigned for each file in a file system. A bitmap image may be used to indicate which clusters in a file system are currently being used.

In block 106, the two sets of file allocation tables and bitmaps are synchronized. A last known good ('LKG') flag is set to the first set in block 108, resulting in the LKG flag indicated on the first set 102 file allocation table and bitmap. Modifications to the file structure are made in block 110 using unused clusters, resulting in the second set 104 of file allocation table and bitmap being modified. After all modifications are made, an atomic change occurs in block 112 when the last known good flag is set to the second set 104 of modified file allocation table and bitmap. The first set 102 is now outdated, but is re-synchronized in block 106 and the cycle begins anew.

Embodiment 100 illustrates one method for performing a transaction-safe file modification. The file modification may include any type of change to a file system, from creating, modifying, renaming, or deleting a file to creating, modifying, renaming, moving, or deleting a directory. In some cases, multiple smaller actions may be performed in a single task. For example, a first file may be deleted and a second file renamed to take the place of the first file in a single transaction.

Figure 2:
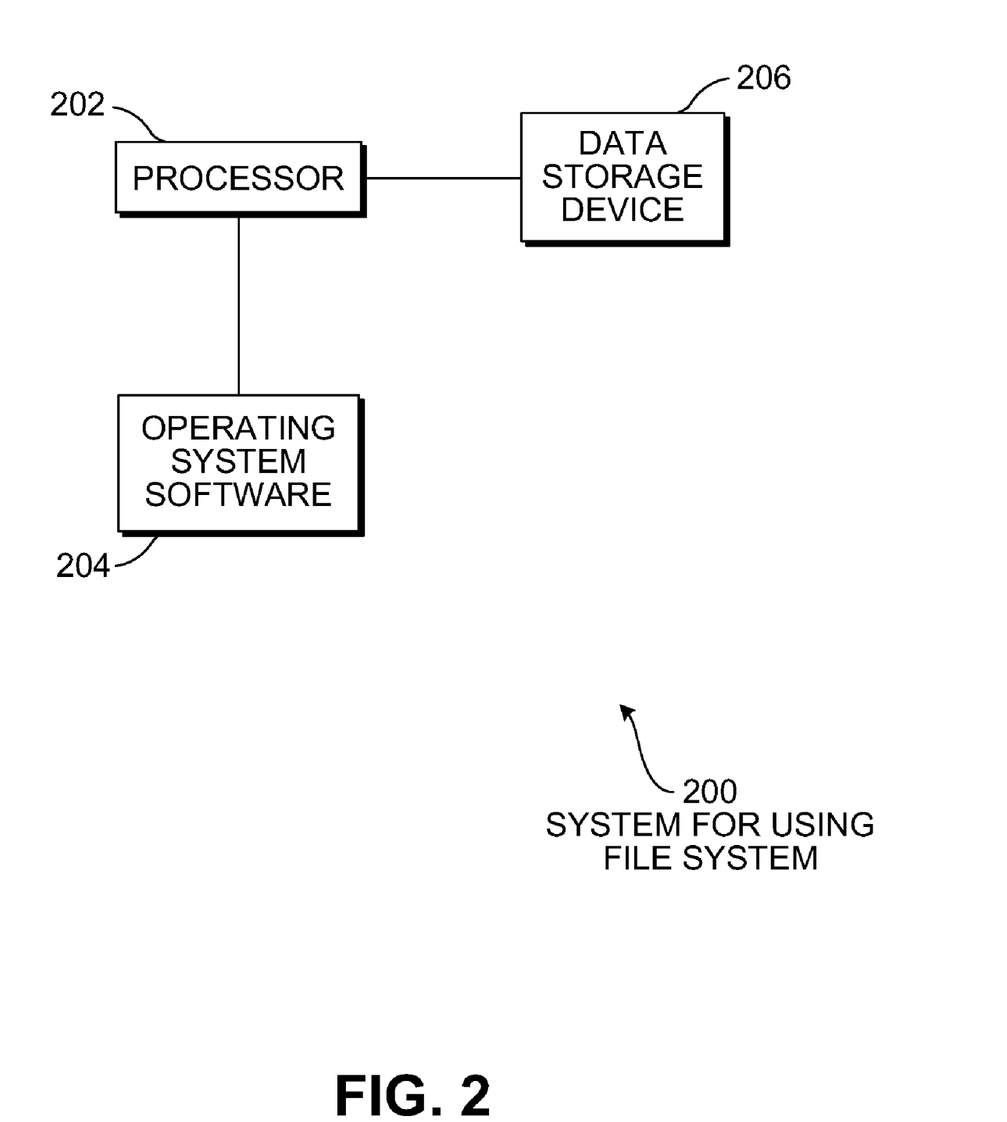
FIG. 2 is a diagrammatic illustration of an embodiment showing a system for using a transaction-safe file system.

FIG. 2 illustrates an embodiment 200 of a system for using a file system. A processor 202 uses operating system software 204 to read and write data from a data storage device 206.

The embodiment 200 may be any type of computing device, from a server computer to a personal computer or handheld device such as a cellular telephone, digital camera, personal digital assistant, video recording device, or any other device that stores data using a file system.

In many cases, the data storage device 206 may be a removable data storage device. For example, the data storage device 206 may be a hot swappable hard disk drive, solid state memory stick, a Universal Serial Bus ('USB') attached data storage device, memory card, or any other removable data storage device. In other cases, the data storage device 206 may generally be a non-removable device but a user may desire to have protection from brownouts or unexpected power failures.

The processor 202 may be any type of computational device. In some cases, the processor 202 may be a state machine, gate array, specialized processor, or other type of logic device, or the processor 202 may be a general purpose processor capable of executing various instructions.

The operating system software 204 may be software that is executed by a general purpose processor 202, or may be built-in logic in a hardware state machine such as a gate array. In some instances, the operational logic may be a set of processor instructions that are stored on the data storage device 206 or on some other data storage device such as a programmable read only memory device, including those that are erasable as well as those that are not.

Figure 3:
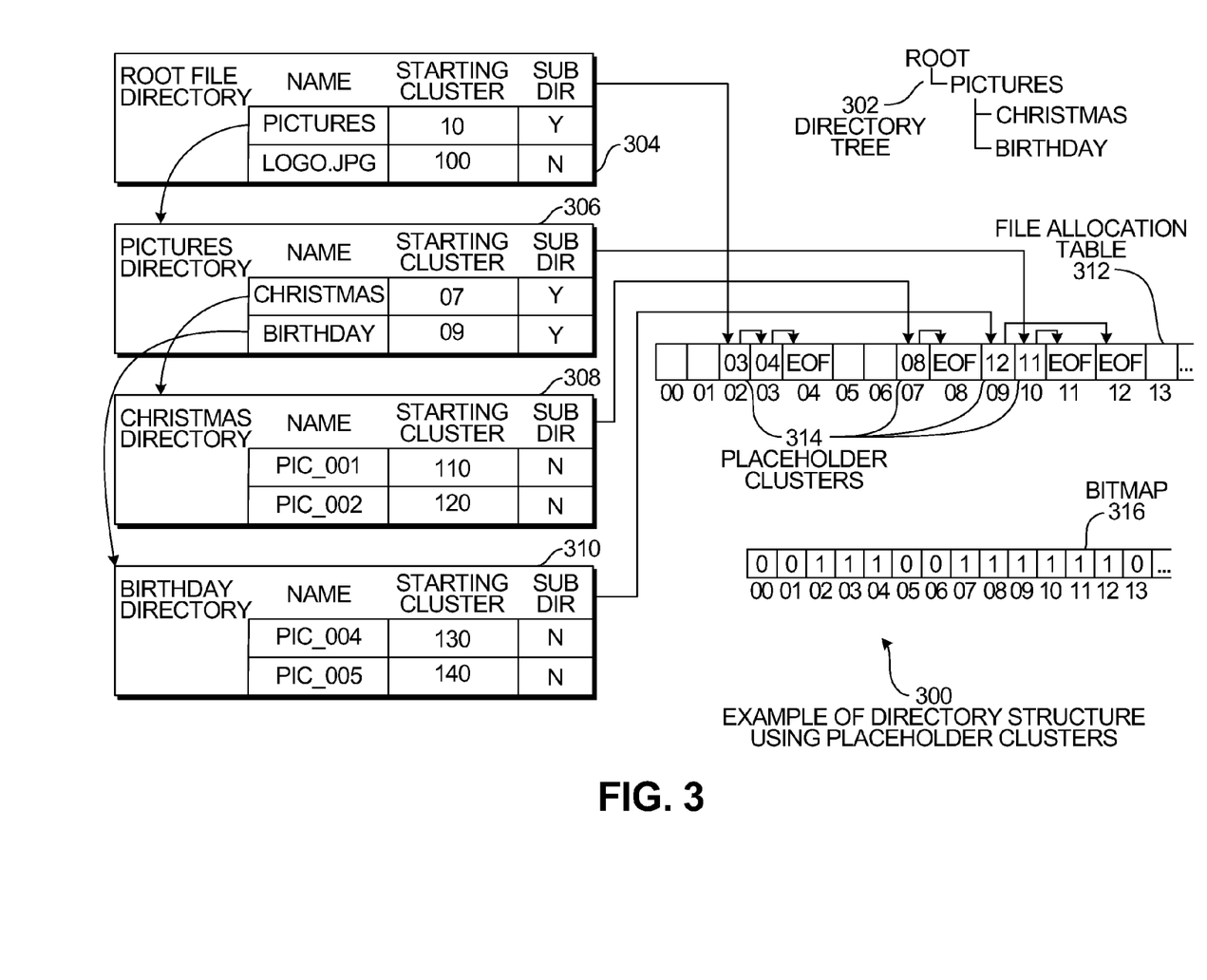
FIG. 3 is a diagrammatic illustration of an embodiment showing an example of a file structure.

FIG. 3 is an illustration of an embodiment 300 of an example of a directory structure where placeholder clusters are used as the first cluster of a directory. The directory tree 302 contains a root directory, under which a 'Pictures' directory resides. The 'Pictures' directory has two subdirectories, 'Christmas' and 'Birthday'.

The root file directory 304 contains the Pictures subdirectory, which has a starting cluster of 10 and is a subdirectory. The root file directory 304 also contains a file logo.jpg which starts at cluster 100. The Pictures subdirectory 306 contains the subdirectory Christmas, which starts at cluster 07 and the subdirectory Birthday, which starts at cluster 09. The Christmas subdirectory 308 contains PIC_001, starting at cluster 110 and PIC_002 starting at cluster 120. The Birthday subdirectory 310 has PIC_004 starting at cluster 130 and PIC_005 starting at cluster 140.

The file allocation table 312 illustrates a portion of a file allocation table that illustrates the sequencing of the various directories. The file allocation table contains addresses that define the sequence of data clusters that are found on a data storage medium, such as a hard disk drive or data storage card. Each of the directories contains a placeholder cluster 314 that is the first cluster in a cluster chain.

In the example of embodiment 300, the root file directory 304 begins at cluster 02. An address of 03 is contained in the 02 register of the file allocation table 312, indicating that the next cluster in the sequence for the root directory 304 is cluster 03. Similarly, cluster 03 contains an address for cluster 04, which contains an EOF or end of file indicator. Similarly, the Pictures directory begins in cluster 10 and goes to cluster 11. The Christmas directory begins in cluster 07 and ends in cluster 08. The Birthday directory begins in cluster 09 and ends in cluster 12.

For each directory, the placeholder cluster 314 may contain dummy data and merely serve as a link to a second cluster that contains actual directory data. Using this architecture, the second cluster may be modified in a transaction-safe mode by creating a copy of the original data cluster and modifying the data cluster in a previously unallocated cluster. In a duplicate copy of the file allocation table 312, the placeholder cluster 314 assigned for that directory may be modified to point to the newly modified cluster. When the entire transaction is committed, the modified file allocation table will point to the newly modified cluster.

If a placeholder cluster 314 were not used, a change to a first cluster of a subdirectory would cause a change in the parent directory, since the parent directory may be modified to point to a new first directory of the modified subdirectory. Similarly, the parent directory of the previous parent directory may be modified and so on, all the way to the root directory. The use of a placeholder cluster 314 may simplify the modification of a duplicate file allocation table 312 in the instance of a transaction-safe system that uses a duplicate file allocation table.

The bitmap image 316 designates which clusters are allocated. As with the file allocation table 312, each register within the bitmap image 316 represents a specific cluster in the data storage media and corresponds with the file allocation table 312. In the present example, a single bit is used to represent whether the particular cluster is being used, with a 0 indicating that the cluster is unused and a 1 indicating that the cluster is used. The bitmap 316 indicates that clusters 02, 03, 04, 07, 08, 09, 10, 11 and 12 are allocated, which corresponds with the file allocation table 312 as illustrated.

Figure 4:
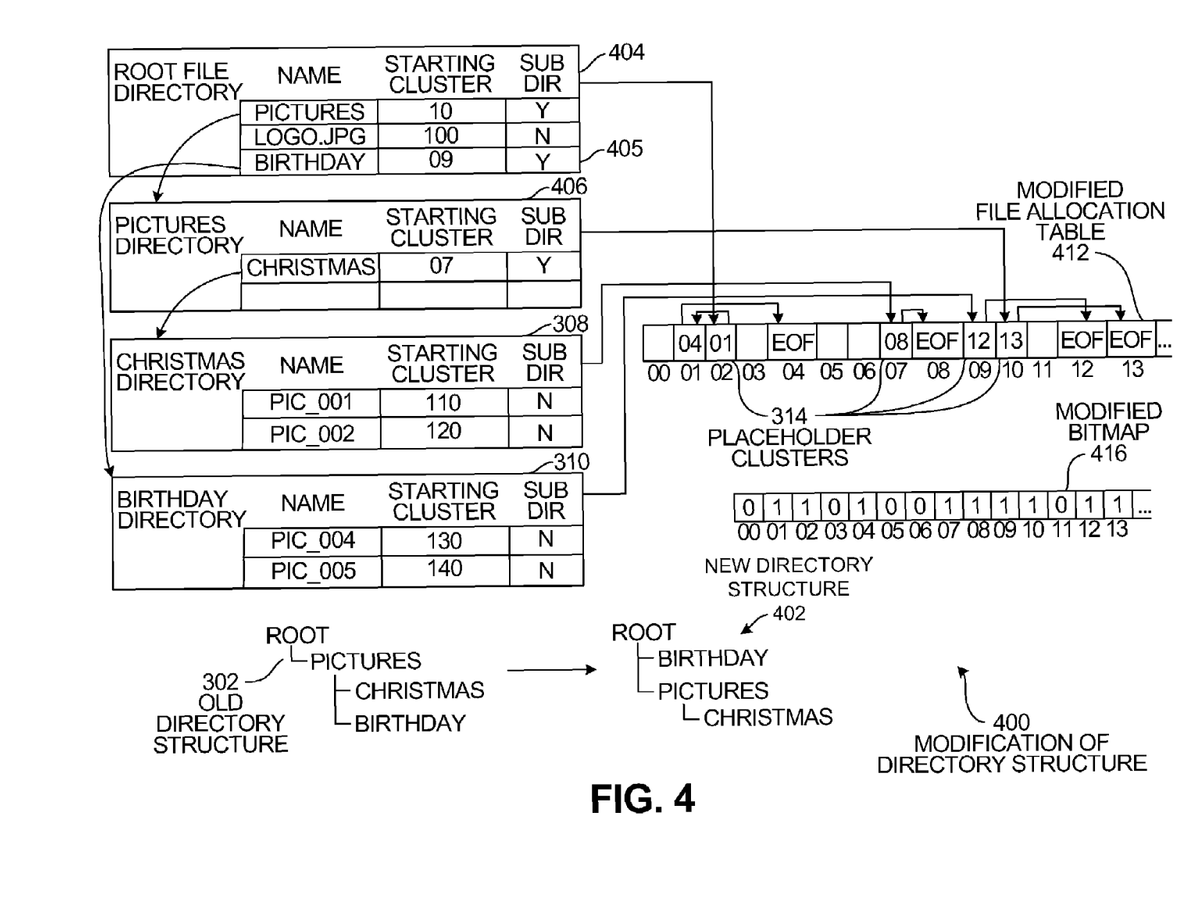
FIG. 4 is a diagrammatic illustration of an embodiment showing the example of FIG. 3 after a file modification is performed.

FIG. 4 illustrates modifications to embodiment 300 as embodiment 400. Embodiment 400 illustrates changes that may occur when the directory structure 302 is changed to directory structure 402. In directory structure 402, the subdirectory Birthday is moved from being a subdirectory of Pictures to a subdirectory of the root directory.

The root directory 404 reflects changes to root directory 304 where the Birthday subdirectory 405 is added. The Birthday subdirectory's starting cluster is 09. Similarly, the Pictures subdirectory 406 reflects changes to the Pictures subdirectory 306 where the Birthday subdirectory was removed.

Each of the directories, including the root directory 404, the Pictures subdirectory 406, the Christmas subdirectory 308, and the Birthday subdirectory 310 retain their initial placeholder clusters 314 as shown in the modified file allocation table 412. The root directory 404 begins in cluster 02, but the changes to the root directory 404 are in the second cluster of the root directory cluster chain, which is now cluster 01 rather than cluster 03 as in embodiment 300. Similarly, changes to the Pictures directory 406 are in the second cluster of the sequence, which is now cluster 13 rather than cluster 11.

The bitmap 416 reflects the modifications to bitmap 316. Clusters 03 and 11 are now unallocated while clusters 01 and 13 are now allocated.

Embodiment 400 illustrates a modification to a file allocation table and bitmap image that may occur when a complex transaction is performed. In the present example, the transaction is to move a directory from one location to another. The transaction involves using a duplicate copy of the file allocation table and bitmap, and performing updates or changes to portions of the file system in unallocated or free clusters. The transaction does not involve modifying existing clusters of data on the data storage medium so that if the transaction is not committed, no data is lost.

The placeholder clusters 314 enable each directory to be referenced by the placeholder cluster. Rather than modifying the data within the placeholder cluster, modified data may be stored in a previously unallocated cluster. This technique may greatly simplify directory structure changes in a transaction-safe environment.

Embodiment 400 illustrates the movement of one subdirectory from a first place in a directory tree to a second place. However, the techniques illustrated in the example may be used for any type of modification to a file structure. For example, creating, modifying, renaming, moving, or deleting files or directories, among other tasks, may be performed using the techniques.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computing device, comprising:
  a data storage device comprising a directory, the directory comprising at least two data clusters including a first data cluster having no transaction-safe data and at least one remaining data cluster comprising transaction-safe data;
  a first file allocation table that defines a placeholder cluster as a starting cluster in a sequence of data clusters for the directory, the placeholder cluster referencing a next data cluster in the sequence that comprises transaction-safe data;
  a second file allocation table, the second file allocation table comprising a copy of the first file allocation table; and
  one or more computer storage media including computer readable instructions that when executed perform operations comprising:
    modifying a third data cluster of the data storage device to contain modified transaction-safe data of the directory,
    modifying the second file allocation table to reference the third data cluster in the sequence of transaction-safe data while retaining the placeholder cluster in the second file allocation table as the starting cluster in the sequence of data clusters for the directory, and
    after modifying the second file allocation table and after the modifying the third data cluster, modifying a last known good indicator (LKG indicator) to indicate a last known good file allocation table.

2. The computing device of claim 1 wherein the directory for which transaction-safe data is modified comprises a root directory.

3. The computing device of claim 1 wherein the computer readable instructions further perform operations comprising:
  after the modifying the LKG indicator, synchronize the first file allocation table with the second file allocation table.

4. The computing device of claim 1 wherein the data storage device comprises a second directory, wherein the computer readable instructions further perform operations comprising moving the second directory.

5. The computing device of claim 1 wherein the last known good file allocation table is the second file allocation table.

6. The computing device of claim 5 wherein the computer readable instructions further perform operations comprising:
  after modifying the LKG indicator to indicate the last known good file allocation table is the second file allocation table, synchronize the first file allocation table with the second file allocation table.

7. The computing device of claim 6 wherein the computer readable instructions further perform operations comprising:
    after the first file allocation table is synchronized with the second file allocation table, modify the LKG indicator to indicate the first file allocation table is the last known good file allocation table.

8. The computing device of claim 1, further comprising:
    a first bitmap image indicating which clusters are allocated; and
    a second bitmap image being synchronized with the first bitmap image, the LKG indicator further adapted to indicate a last known good bitmap image.

9. The computing device of claim 1 wherein the third data cluster is a second cluster in the sequence of data clusters for the directory.

10. The computing device of claim 1 wherein the LKG indicator is selected from a group consisting of a flag and a pointer.

11. A computing device, comprising:
    a first file allocation table adapted to define a sequence of data storage clusters;
    a plurality of directories, a first directory of the plurality of directories comprising at least two data clusters including a first data cluster having no transaction-safe data and at least one remaining data cluster comprising transaction-safe data;
    a second file allocation table as a synchronized copy of the first file allocation table;
    a first bitmap image indicating which clusters are allocated;
    a second bitmap image as a synchronized copy of the first bitmap image;
    a last known good indicator (LKG indicator) of a last known good file allocation table, the LKG indicator being further adapted to indicate a last known good bitmap image; and
    one or more computer storage media including computer readable instructions that when executed perform operations comprising:
        modifying the first directory by operations comprising:
            determining a third data cluster is unused;
            storing a change to the transaction-safe data of the at least one remaining data cluster in the third data cluster;
            updating the second file allocation table to reflect the change by modifying the second file allocation table to reference the third data cluster via the sequence of data storage clusters, while retaining a placeholder cluster in the second file allocation table as a starting cluster;
            updating the second bitmap image to reflect the change; and
            after storing the change, updating the second file allocation table and updating the second bitmap image, setting the LKG indicator to indicate the second file allocation table as the last known good file allocation table and the second bitmap image as the last known good bitmap image.

12. The computing device of claim 11 wherein the computer readable instructions further perform operations comprising
    synchronizing the first file allocation table with the second file allocation table; and
    synchronizing the first bitmap image with the second bitmap image.

13. The computing device of claim 11 wherein storing the change in the third unused cluster occurs prior to the updating the second file allocation table to reflect the change.

14. The computing device of claim 11 wherein updating the second file allocation table further comprises updating the placeholder cluster to reference the third data cluster as the next data cluster in the sequence of data storage clusters that comprises transaction-safe data.

15. The computing device of claim 11 wherein the LKG indicator is selected from the group consisting of a flag and a pointer.

16. A computing device, comprising:
    a first directory comprising at least two data clusters including a first data cluster having no transaction-safe data and at least one remaining data cluster comprising transaction-safe data;
    a first file allocation table adapted to define a sequence of data storage clusters, the first file allocation table comprising a placeholder cluster as a starting cluster of the first directory, the placeholder cluster referencing a next cluster in the sequence;
    a second file allocation table, the second file allocation table comprising a copy of the first file allocation table;
    a last known good indicator (LKG indicator) of a last known good file allocation table, the LKG indicator indicating the first file allocation table is the last known good file allocation table; and
    one or more computer storage media including computer readable instructions that when executed perform operations comprising:
        modifying the first directory by operations comprising:
            determining a next data cluster is an unallocated data cluster;
            making a change to the transaction-safe data of the at least one remaining data cluster in the next data cluster;
            modifying the second file allocation table to define the next data cluster as part of the at least one remaining data cluster comprising transaction-safe data for the directory while retaining the first placeholder cluster in the second file allocation table as a starting cluster; and
            updating the first file allocation table to reflect the change by synchronizing with the second file allocation table.

17. A method, comprising:
    determining a first file allocation table is a last known good file allocation table;
    synchronizing the first file allocation table with a second file allocation table;
    storing a directory in a file system on a computing device by creating a first data cluster having no transaction-safe data and a subsequent second data cluster comprising transaction-safe data;
    storing an address for the second data cluster in a placeholder cluster in the second file allocation table, the second file allocation table defines a placeholder cluster as a starting cluster in a sequence of data clusters for the directory, the placeholder cluster referencing the address as a next data cluster in the sequence of data clusters for the directory;
    making a change to the transaction-safe data using the first data cluster of the directory;
    updating the second file allocation table to reflect the change by modifying the second file allocation table to reference the first data cluster of the directory while retaining the placeholder cluster in the second file allocation table as the starting cluster in the sequence of data clusters for the directory; and after completing the change, the modifying a last known good indicator (LKG indicator) to indicate the second file allocation table as a last known good file allocation table.

18. The method of claim 17 wherein the synchronizing operation occurs after the modifying operation.

19. The method of claim 17, further comprising:
defining a first bitmap image designating which clusters are allocated; and
synchronizing a second bitmap image with the first bitmap image, the LKG indicator being further adapted to indicate a last known good bitmap image.

20. A method, comprising:
storing a directory in a file system on a computing device by creating a first data cluster including no transaction-safe data and a subsequent second data cluster comprising transaction-safe data;
storing an address for the second data cluster in a placeholder cluster in a first file allocation table, the first file allocation table defines a sequence of data clusters, the placeholder cluster being stored in a location for the first data cluster in the first file allocation table;
defining a first bitmap image designating which clusters are allocated within the file system;
synchronizing the first file allocation table with a second file allocation table;
synchronizing a second bitmap image with the first bitmap image;
modifying a last known good indicator (LKG indicator) to indicate that the first file allocation table is a last known good file allocation table, the LKG indicator being further adapted to indicate a last known good bitmap image;
making a change to the transaction-safe data using the first cluster;
updating the second file allocation table to reflect the change by modifying the second file allocation table to reference the first cluster while retaining a placeholder cluster in the second file allocation table, the placeholder cluster referencing the address as a next data cluster in the sequence of data storage clusters;
updating the second bitmap image to reflect the change;
after completing the change, setting the LKG indicator to indicate the second file allocation table is the last known good file allocation table and the second bitmap image is the last known good bitmap image.

21. A method, comprising:
synchronizing a first file allocation table (FAT) with a second FAT, the first FAT defining a directory in a file system, the directory comprising a first data cluster having no transaction-safe data and a subsequent second data cluster having transaction-safe data, the first FAT further defining a placeholder cluster as a starting cluster in a sequence of data clusters for the directory, the placeholder cluster comprising a second address for the second data cluster, the placeholder cluster defining the second address as a next data cluster in the sequence of data clusters for the directory;
updating the second data cluster by creating a third data cluster having a third address;
updating the second address referenced by the placeholder in the second file allocation table to the third address while retaining the placeholder cluster in the second file allocation table as the starting cluster in the sequence of data clusters for the directory; and
modifying a last known good indicator (LKG indicator) to indicate the second file allocation table is a last known good file allocation table.

22. A method, comprising:
synchronizing a second file allocation table (FAT) with a first FAT, the first FAT defining a directory in a file system, the directory comprising a first data cluster having no transaction-safe data and a subsequent second data cluster having transaction-safe data, the first FAT further defining a location for the first data cluster, the location for the first cluster storing a second address for the second data cluster;
synchronizing a second bitmap image with a first bitmap image, the bitmap images designating which clusters are allocated within the file system;
determining a third data cluster is currently not allocated;
updating the second cluster by using the third data cluster having a third address;
updating the second address in the second FAT to the third address;
changing the second bitmap image to indicate the third cluster is used;
changing the second bitmap image to indicate the second cluster is not used;
modifying a last known good indicator (LKG indicator) to indicate the second file allocation table is a last known good file allocation table and the second bitmap image is a last known good bitmap image.

* * * * *